US012728530B2

(12) United States Patent
Wakayama et al.

(10) Patent No.: US 12,728,530 B2
(45) Date of Patent: Sep. 8, 2026

(54) CONTROL DEVICE, CONTROL METHOD, AND STORAGE MEDIUM FOR SYNCHRONIZING COMPLETION TIMES OF ROBOT TASKS

(71) Applicant: NEC Corporation, Tokyo (JP)

(72) Inventors: Hisaya Wakayama, Tokyo (JP); Hiroyuki Oyama, Tokyo (JP); Mineto Satoh, Tokyo (JP); Takehiro Itou, Tokyo (JP); Masatsugu Ogawa, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 882 days.

(21) Appl. No.: 17/799,635

(22) PCT Filed: Feb. 25, 2020

(86) PCT No.: PCT/JP2020/007423
§ 371 (c)(1),
(2) Date: Aug. 12, 2022

(87) PCT Pub. No.: WO2021/171352
PCT Pub. Date: Sep. 2, 2021

(65) Prior Publication Data

US 2023/0072442 A1 Mar. 9, 2023

(51) Int. Cl.
*B25J 9/16* (2006.01)
*B25J 13/00* (2006.01)
*G05B 19/418* (2006.01)
*G06F 9/48* (2006.01)

(52) U.S. Cl.
CPC ............. *B25J 9/1661* (2013.01); *B25J 13/00* (2013.01); *G05B 19/418* (2013.01); *G06F 9/485* (2013.01); *G06F 9/4881* (2013.01)

(58) Field of Classification Search
CPC ...... G06F 9/4881; G06F 9/485; B25J 9/1661; B25J 13/00; G05B 19/418
USPC .......................................................... 718/102
See application file for complete search history.

(56) References Cited

U.S. PATENT DOCUMENTS 9,513,627 B1 * 12/2016 Elazary ............ G05B 19/41865
10,486,305 B2 * 11/2019 Buerger ............. G05B 19/0426
12,521,881 B2 * 1/2026 Oyama .................. B25J 9/1661
(Continued)

FOREIGN PATENT DOCUMENTS

JP 2000-090158 A 3/2000
JP 2006-106919 A 4/2006
(Continued)

OTHER PUBLICATIONS

International Search Report for PCT Application No. PCT/JP2020/007423, mailed on May 26, 2020.
(Continued)

*Primary Examiner* — Jacob D Dascomb
(74) *Attorney, Agent, or Firm* — Sughrue Mion, PLLC

(57) ABSTRACT

A control device generates, in a case where multiple tasks to be executed by one or more robots are designated, one or more task groups obtained by classifying the multiple tasks, and generates one or more operation sequences of the one or more robots for completing the multiple tasks to synchronize completion time of tasks included in the one or more task groups.

17 Claims, 11 Drawing Sheets

(56) References Cited

U.S. PATENT DOCUMENTS

| | | | | |
|---|---|---|---|---|
| 2006/0217841 | A1* | 9/2006 | Matsumoto | G05B 19/41815 700/248 |
| 2008/0109114 | A1 | 5/2008 | Oda et al. | |
| 2015/0025684 | A1* | 1/2015 | Negishi | G05B 19/4103 700/245 |
| 2016/0059412 | A1* | 3/2016 | Oleynik | G05B 19/42 700/250 |
| 2018/0085922 | A1 | 3/2018 | Ooba | |
| 2019/0101919 | A1* | 4/2019 | Kobilarov | B60W 60/0011 |
| 2019/0143524 | A1 | 5/2019 | Takahashi et al. | |
| 2019/0212753 | A1 | 7/2019 | Sarkar et al. | |
| 2021/0321813 | A1 | 10/2021 | Shiraki | |

FOREIGN PATENT DOCUMENTS

| | | | |
|---|---|---|---|
| JP | 2011-108156 | A | 6/2011 |
| JP | 2014-163541 | A | 9/2014 |
| JP | 2017-536247 | A | 12/2017 |
| JP | 2018-051684 | A | 4/2018 |
| JP | 2019-071041 | A | 5/2019 |
| JP | 2019-084664 | A | 6/2019 |
| JP | 2019-125341 | A | 7/2019 |
| WO | 2008/149942 | A1 | 12/2008 |
| WO | 2020/166723 | A2 | 8/2020 |

OTHER PUBLICATIONS

Japanese Office Action for JP Application No. 2022-502358, mailed on May 9, 2022 with English Translation.

* cited by examiner 2
24a
INPUT UNIT
DISPLAY UNIT
24b
22
MEMORY
23
INTERFACE
29
PROCESSOR
21

CONTROL DEVICE, CONTROL METHOD, AND STORAGE MEDIUM FOR SYNCHRONIZING COMPLETION TIMES OF ROBOT TASKS

This application is a National Stage Entry of PCT/JP2020/007423 filed on Feb. 25, 2020, the contents of all of which are incorporated herein by reference, in their entirety.

TECHNICAL FIELD

The present invention relates to a technical field of a control device, a control method, and a storage medium for performing processing related to a task to be performed by a robot.

BACKGROUND ART

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container so as to minimize the cycle time based on the index calculated with respect to each of the possible orders.

CITATION LIST

Patent Literature

Patent Literature 1: JP 2018-51684A

SUMMARY

Problem to be Solved

In such a case where a robot handles a plurality of objects, if the operation sequence of the robot is determined from the viewpoint of minimizing the cycle time as in the robot controller disclosed in Patent Literature 1, a variation could occur in the timing at which the task for each object is completed.

In view of the above-described issue, it is therefore an example object of the present disclosure to provide a control device, a control method, and a storage medium capable of suitably generating an operation sequence of a robot in view of the issues described above.

Means for Solving the Problem

In one mode of the control device, there is provided a control device including: a task group generation means configured to generate, in a case where multiple tasks to be executed by one or more robots are designated, one or more task groups obtained by classifying the multiple tasks; and an operation sequence generation means configured to generate one or more operation sequences of the one or more robots for completing the multiple tasks so as to put completion time of tasks included in the task group close to one another.

In one mode of the control method, there is provided a control method executed by a computer, the control method including: generating, in a case where multiple tasks to be executed by one or more robots are designated, one or more task groups obtained by classifying the multiple tasks; and generating one or more operation sequences of the one or more robots for completing the multiple tasks so as to put completion time of tasks included in the task group close to one another.

In one mode of the storage medium, there is provided a storage medium storing a program executed by a computer, the program causing the computer to function as: a task group generation means configured to generate, in a case where multiple tasks to be executed by one or more robots are designated, one or more task groups obtained by classifying the multiple tasks; and an operation sequence generation means configured to generate one or more operation sequences of the one or more robots for completing the multiple tasks so as to put completion time of tasks included in the task group close to one another.

Effect

An example advantage according to the present invention is to suitably generate an operation sequence of a robot in view of the timings at which tasks are completed.

EXAMPLE EMBODIMENTS

Hereinafter, an example embodiment of a control device, a control method, and a storage medium will be described with reference to the drawings.

First Example Embodiment (1) System Configuration

Figure 1:
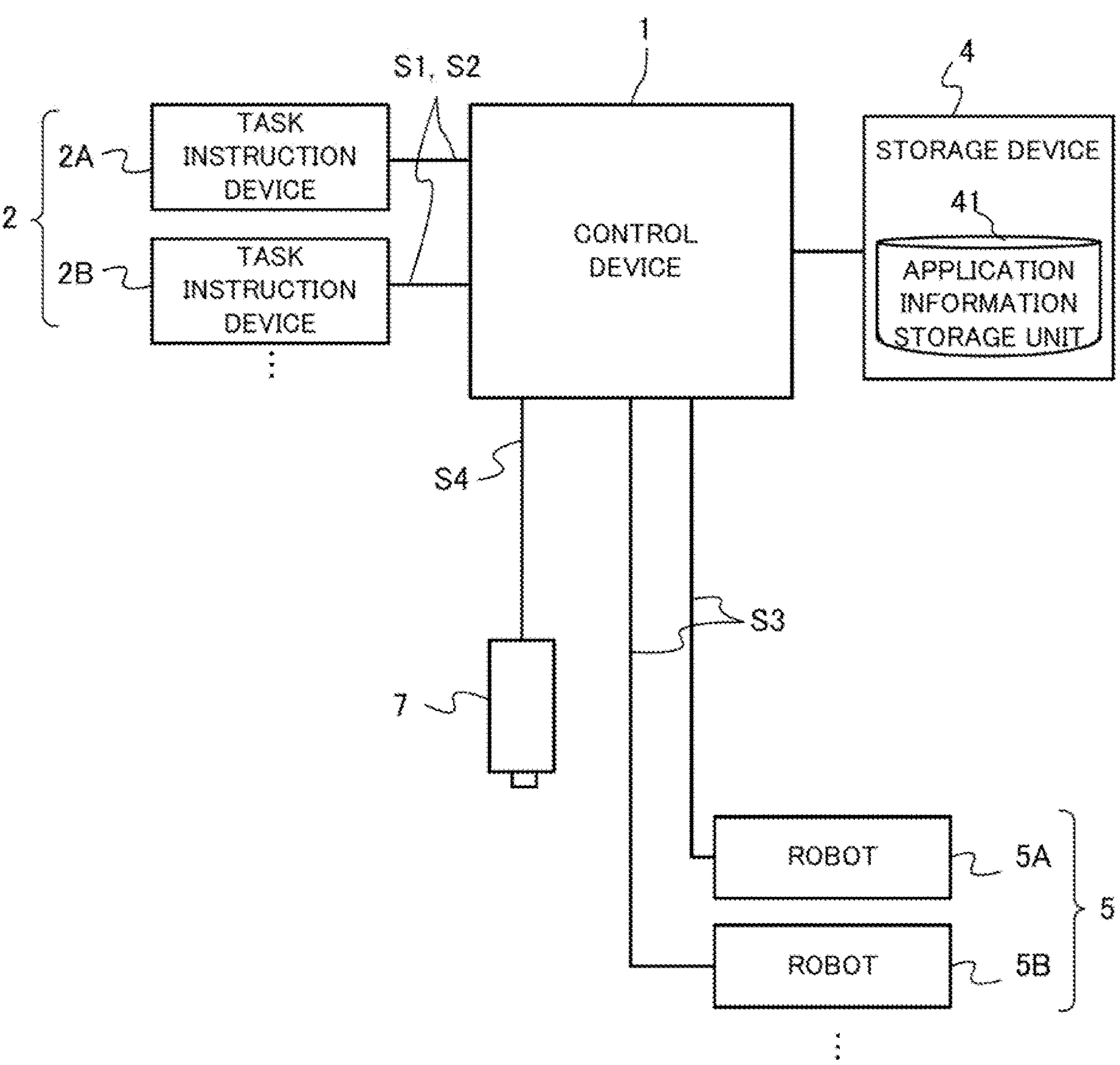
FIG. 1 illustrates the configuration of a robot control system.

FIG. 1 shows a configuration of a robot control system 100 according to the first example embodiment. The robot control system 100 mainly includes a control device 1, a plurality of task instruction devices 2 (2A, 2B, . . . ), a storage device 4, a plurality of robots 5 (5A, 5B, . . . ), and a measurement device 7.

When a task to be performed by the robots 5 is designated, the control device 1 generates a sequence of simple tasks which each of the robots 5 can accept on a time step (discrete time) basis, and controls each of the robots 5 based on the generated sequence. Hereafter, each task (command) into which a task is decomposed by a unit that can be accepted by each of the robots 5 is referred to as "subtask", and a sequence of subtasks to be executed by each of the robots 5 in order to achieve the designated task is referred to as "subtask sequence". The subtask sequence corresponds to an operation sequence that defines a series of behaviors (movements or operations) of each of the robots 5. In the present example embodiment, when a plurality of tasks are designated, each of the robots 5 executes the subtask sequence assigned to the each of the robots 5 to complete the plurality of tasks through collaboration. Hereafter, all tasks (i.e., all designated tasks) that need to be performed by the robots 5 are also referred to as "all target tasks".

Further, the control device 1 performs data communication with the task instruction device 2, the storage device 4, the robot 5, and the measurement device 7, via a communication network, or by direct wireless or wired communication. For example, the control device 1 receives input information "S1" designating tasks from a task instruction device 2. Further, the control device 1 transmits display information "S2" for accepting the designation of the tasks to be performed by the robots 5 to the task instruction device 2. The control device 1 transmits a control signal "S3" regarding the control of the robots 5 to the robots 5. Further, the control unit 1 receives an output signal "S4" from the measurement device 7.

The task instruction devices 2 (2A, 2B, . . . ) are devices each of which serves as an interface for accepting a task designation from a user. The task instruction devices 2 display information based on the display information S2 supplied from the control device 1, and supply the input information S1 generated based on the user input to the control device 1. As will be described later, each of the task instruction devices 2 can accept a plurality of task designations all at once. Examples of the task instruction devices 2 include: a tablet terminal equipped with an input unit and a display unit; a stationary personal computer; a terminal used by an operator who performs a predetermined operation by controlling, remotely or at a short distance, the robots 5 arranged in a factory or the like; and may be a terminal used for orders by a customer who receives a service. In the case of the provision of food and beverage, each order in units of an item is recognized as a task, respectively.

The storage device 4 includes an application information storage unit 41. The application information storage unit 41 stores application information necessary for generating a subtask sequence from the given tasks. Details of the application information will be described later with reference to FIG. 3. The storage device 4 may be an external storage device such as a hard disk connected to or built in to the control device 1, or may be a storage medium such as a flash memory. The storage device 4 may be a server device that performs data communication with the control device 1 through a communication network. In this case, the storage device 4 may be configured by a plurality of server devices.

The robots 5 (5A, 5B, . . . ) perform the tasks on the basis of the control signals S3 supplied from the control device 1. Examples of the robots 5 include a vertically articulated robot, a horizontally articulated robot, an automated guided vehicle (AGV: Automated Guided Vehicle), and any other type of robot. Each robot 5 may supply a state signal indicating the state of each robot 5 to the control device 1. The state signal may be an output signal outputted by one or more sensors for detecting a state (e.g., position and angle) of the entire robot 5 or the specific portions thereof such as a joint, or may be a signal, generated by the control unit of each robot 5, indicating the state of the progress of the subtasks to be performed by each robot 5.

The measurement device 7 is one or more sensors configured to detect the state of the workspace in which the task is performed and examples of the sensors include a camera, a laser range sensor, a sonar, and any combination thereof. The measurement device 7 supplies the generated output signal S4 to the control device 1. The measurement device 7 may include a self-propelled sensor or a flying sensor (including a drone) that moves in the workspace. The measurement device 7 may also include one or more sensors provided in a robot 5 or provided in other objects in the workspace. The measurement device 7 may also include a sensor configured to detect sounds in the workspace. Thus, the measurement device 7 may include various sensors for detecting the state of the workspace and may be provided at any locations.

The configuration of the robot control system 100 shown in FIG. 1 is an example, and thus various changes may be applied to the configuration. For example, there may be a plurality of robots 5, and each of the robots may include plural objects subject to control each of which operates independently such as robot arms. Even in these cases, the control device 1 generates, based on all target tasks, the subtask sequence to be performed by each of the robots 5 or each object subject to control, and transmits the control signal S3 based on the subtask sequence to the each of the robots 5. Each robot 5 may be configured to perform a cooperative work with other robots, workers or machine tools operating in the workspace. The measurement device 7 may be part of a robot 5. The task instruction device 2 may be incorporated into the control device 1. The control device 1 may be configured by a plurality of devices. In this case, the plurality of devices functioning as the control device 1 exchange information necessary to execute the pre-allocated process among the plurality of devices. Further, a robot 5 may incorporate at least a part or all of the functions of the control device 1.

(2) Hardware Configuration

Figures 2A, 2B:
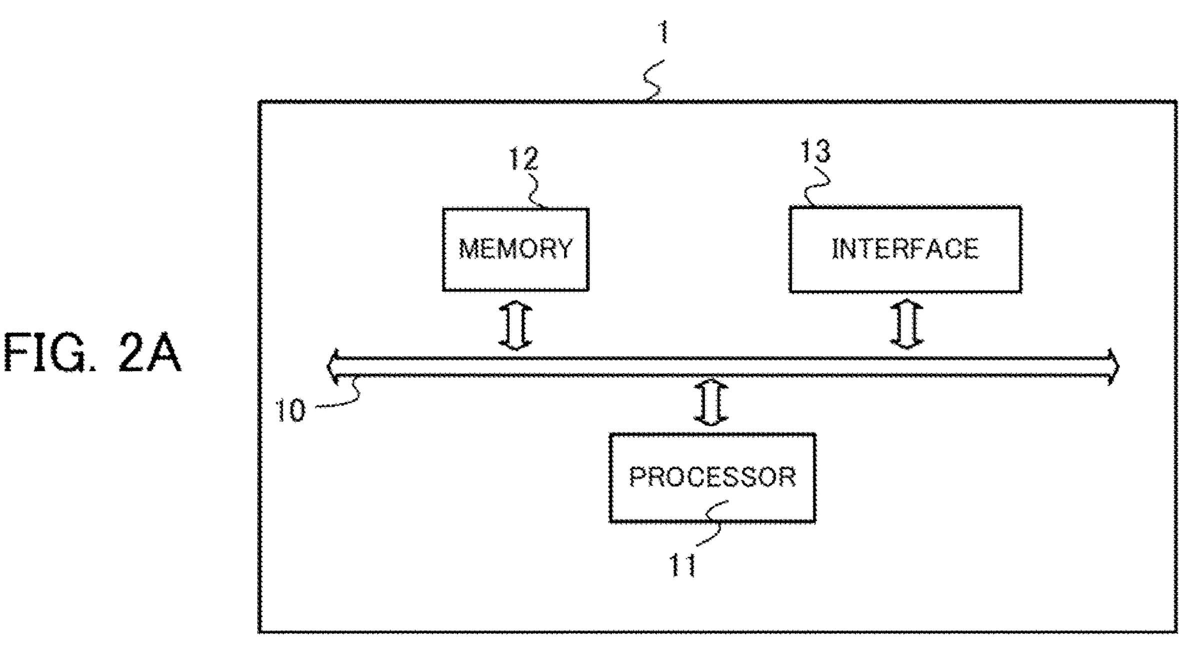
FIG. 2 illustrates the hardware configuration of a control device.

FIG. 2A shows a hardware configuration of the control device 1. The control device 1 includes, as hardware, a processor 11, a memory 12, and an interface 13. The processor 11, the memory 12, and the interface 13 are connected via a data bus 10 to one another.

The processor 11 executes a predetermined process by executing a program stored in the memory 12. The processor 11 is one or more processors such as a CPU (Central Processing Unit) and a GPU (Graphics Processing Unit).

The memory 12 is configured by various volatile and non-volatile memories such as a RAM (Random Access Memory) and a ROM (Read Only Memory). Further, the memory 12 stores a program for the control device 1 to execute a predetermined process. The memory 12 is used as a work memory and temporarily stores information acquired from the storage device 4. The memory 12 may function as a storage device 4. In contrasts, the storage device 4 may function as the memory 12 of the control device 1. The program executed by the control device 1 may be stored in a storage medium other than the memory 12.

The interface 13 is an interface for electrically connecting the control device 1 to other external devices. For example, the interface 13 includes an interface for connecting the control device 1 to the task instructors 2 and an interface for connecting the control device 1 to the storage device 4. The interface 13 includes an interface for connecting the control device 1 to the robots 5, and an interface for connecting the control device 1 to the measurement device 7. These connections may be wired connections and may be wireless connections. For example, the interface for connecting the control device 1 to these external devices may be a communication interface for wired or wireless transmission and reception of data to and from these external devices under the control of the processor 11. In another example, the control device 1 and the external devices may be connected by a cable or the like. In this case, the interface 13 includes an interface which conforms to an USB (Universal Serial Bus), a SATA (Serial AT Attachment), or the like for exchanging data with the external devices.

The hardware configuration of the control device 1 is not limited to the configuration shown in FIG. 2A. For example, the control device 1 may be connected to or incorporate at least one of a display device, an input device, or a sound output device. Further, the control device 1 may be configured to include at least one of a task instruction device 2 or the storage device 4.

FIG. 2B shows a hardware configuration of a task instruction device 2. The task instruction device 2 includes, as hardware, a processor 21, a memory 22, an interface 23, an input unit 24*a*, and a display unit 24*b*. The processor 21, memory 22, and interface 23 are connected via a data bus 29 to one another. Further, the input unit 24*a* and the display unit 24*b* is connected to the interface 23.

The processor 21 executes a predetermined process by executing a program stored in the memory 22. The processor 21 is one or more processors such as a CPU and a GPU. The processor 21 generates the input information S1 by receiving the signal input unit 24*a* via the interface 23, and transmits the input information S1 to the control device 1 via the interface 23. The processor 21 supplies the display information S2 received from the control device 1 through the interface 23 to the display unit 24*b* via the interface 23.

The memory 22 is configured by various volatile and non-volatile memories such as a RAM and a ROM. The memory 22 stores a program for the task instruction device 2 to execute a predetermined process. The memory 22 is also used as a working memory. The memory 22 may also include non-volatile memory such as a flash memory and a hard disk.

The interface 23 is an interface for electrically connecting the task instruction device 2 to other devices. For example, the interface 23 includes a communication interface for task instructor 2 to wirelessly or wirelessly communicate with other devices. The interface 23 performs an interface operation of the input unit 24*a* and the display unit 24*b* to the processor 21 and the memory 22. The input unit 24*a* generates an input signal in response to the user's operation. Examples of the input unit 24*a* include a touch panel, a button, a keyboard, a voice input device, and a combination thereof. Examples of the display unit 24*b* include a display and a projector, and the display unit 24*b* displays information based on the display information S2 under the control by the processor 21.

The hardware configuration of the task instruction device 2 is not limited to the configuration shown in FIG. 2B. For example, the input unit 24*a* and the display unit 24*b* may be configured as separate devices electrically connected to the task instruction device 2. The task instruction device 2 may be connected to various devices such as a sound output device, a camera, or may incorporate these devices.

(3) Application Information

Next, a data structure of the application information stored in the application information storage unit 41 will be described.

Figure 3:
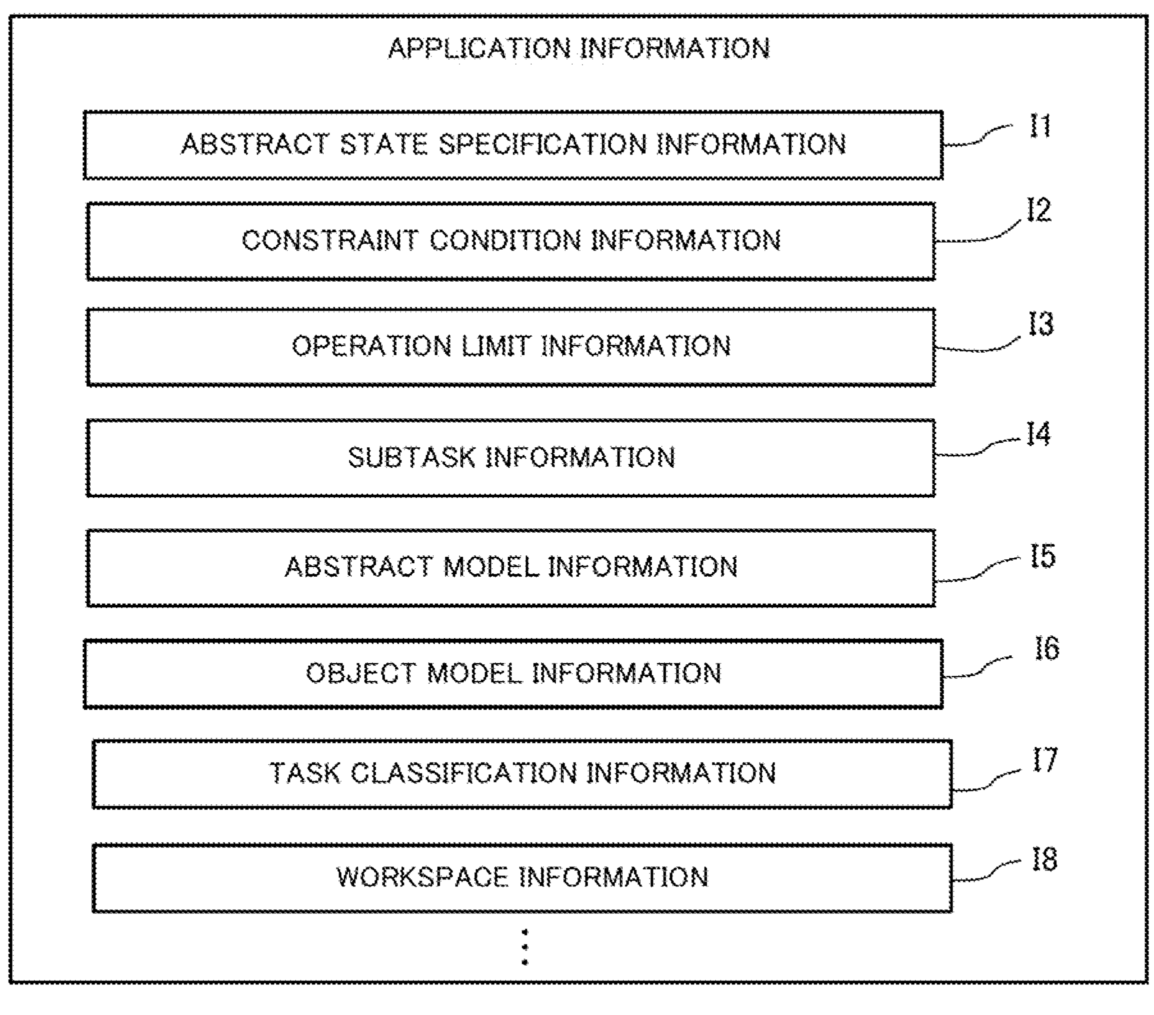
FIG. 3 illustrates an example of the data structure of application information.

FIG. 3 illustrates an example of a data structure of application information stored in the application information storage unit 41. As shown in FIG. 3, the application information storage unit 41 includes abstract state specification information I1, constraint condition information I2, operation limit information I3, subtask information I4, abstract model information I5, object model information I6, task classification information I7, and workspace information I8.

The abstract state specification information I1 specifies an abstract state to be defined in order to generate the subtask sequence. The above-mentioned abstract state is an abstract state of an object in the workspace, and is defined as a proposition to be used in the target logical formula to be described later. For example, the abstract state specification information I1 specifies the abstract state to be defined for each type of the tasks.

The constraint condition information I2 indicates constraint conditions at the time of performing the tasks. The constraint condition information I2 indicates, for example, a constraint that the robots 5 (robot arms) must not be in contact with an obstacle when the task is pick-and-place, and a constraint that the robots 5 (robot arms) must not be in contact with one another, and the like. The constraint condition information I2 may be information in which the constraint conditions suitable for each type of the tasks are recorded.

The operation limit information I3 shows information on the operation limit of the robots 5 to be controlled by the control device 1. For example, the operation limit information I3 defines the upper limits of the speed, the acceleration, and the angular velocity of the robots 5. Further, when the robots 5 are supposed to carry out the transport of objects, the information on the load capacity of each robot 5 regarding the weight or the number of objects is included in the operation limit information I3. Incidentally, the operation limit information I3 may be information defining the operation limit for each movable portion or joint of the robots 5.

The subtask information I4 indicates information on subtasks that the robots 5 can accept. For example, when the task is pick-and-place, the subtask information I4 defines a subtask "reaching" that is the movement of a robot arm of the robots 5, and a subtask "grasping" that is the grasping by a robot arm. The subtask information I4 may indicate information on subtasks that can be used for each type of the tasks.

The abstract model information I5 is information on an abstract model in which the dynamics in the workspace are abstracted. The abstract model is represented by a model in which real dynamics are abstracted by a hybrid system, as will be described later. The abstract model Information I5 includes information indicative of the switching conditions of the dynamics in the above-mentioned hybrid system. For example, in the case of a pick-and-place task requiring the robots 5 to pick (grab) an object and place it at a predetermined position, one of the switching conditions is that the target object cannot be moved unless it is grabbed by a robot 5. The abstract model information I5 includes information on an abstract model suitable for each type of the tasks.

The object model information I6 is information on an object model of each object in the workspace to be recognized from the output signal S4 generated by the measurement device 7. Examples of the each object described above include the robots 5, obstacles, tools and other objects handled by the robots 5, and working objects (workers) other than the robots 5. For example, the object model information I6 includes: information which the control device 1 requires to recognize the type, the position, the posture, the currentlyexecuting operation and the like of the each object described above; and three-dimensional shape information such as CAD (Computer Aided Design) data for recognizing the three-dimensional shape of the each object. The former information includes the parameters of an inference engine obtained by learning a learning model used in a machine learning such as a neural network. For example, the above-mentioned inference engine is learned in advance to output, when an image is inputted thereto, the type, the position, the posture, and the like of an object shown in the image.

Task classification information I7 is information indicating possible classes of tasks that may be designated. In some embodiments, the classification of the tasks based on the task classification information I7 is performed so that tasks that are to be completed at the same timing belong to the same class (category). For example, provided that each task is made per order item in the provision of food and beverage, each task is classified in advance into any of categories such as beverages, appetizers (snacks), main dishes, and desserts. Similarly, for the provision of services other than services in a restaurant and a work in a factory or the like where there are tasks requiring synchronization of the completion time, the task classification information I7, which indicates the classification result in which tasks that are to be completed at the same timing belong to the same category, is generated in advance.

The workspace information I8 is information (so-called map information) indicating the layout of the workspace where the robots 5 perform the tasks. In this case, if a robot 5 is a mobile robot, the workspace information I8 includes information on the passages through which the robot 5 can pass and obstacles that obstruct the passage of the robot 5. In addition, if the task is the transport (provision) of objects, the workspace information I8 may include information indicating the transport location (i.e., destination) of the objects. Also, if the task is the provision of food and beverages, the workspace information I8 may include information indicative of each position of tables on which the task instruction devices 2 are respectively located. In this case, the workspace information I8 may include information associating the identification information of each of the task instruction devices 2 with the identification information of each table in which each task instruction device 2 is arranged.

As described above, the application information includes robot motion information indicating the operating characteristics (motion characteristics) of the robot 5, the robot configuration (form) information relating to the configuration (form) of the robot 5, and information relating to objects other than the robots 5. It is noted that examples of the robot motion information include the operation limit information I3, the subtask information I4, and the abstract model information I5, and examples of the robot configuration information include the object model information I6. In addition to the information described above, the application information storage unit 41 may further store various kinds of information related to the generation process of the subtask sequence and the generation process of the display information S2.

(4) Outline of Process by Control Unit

Figure 4:
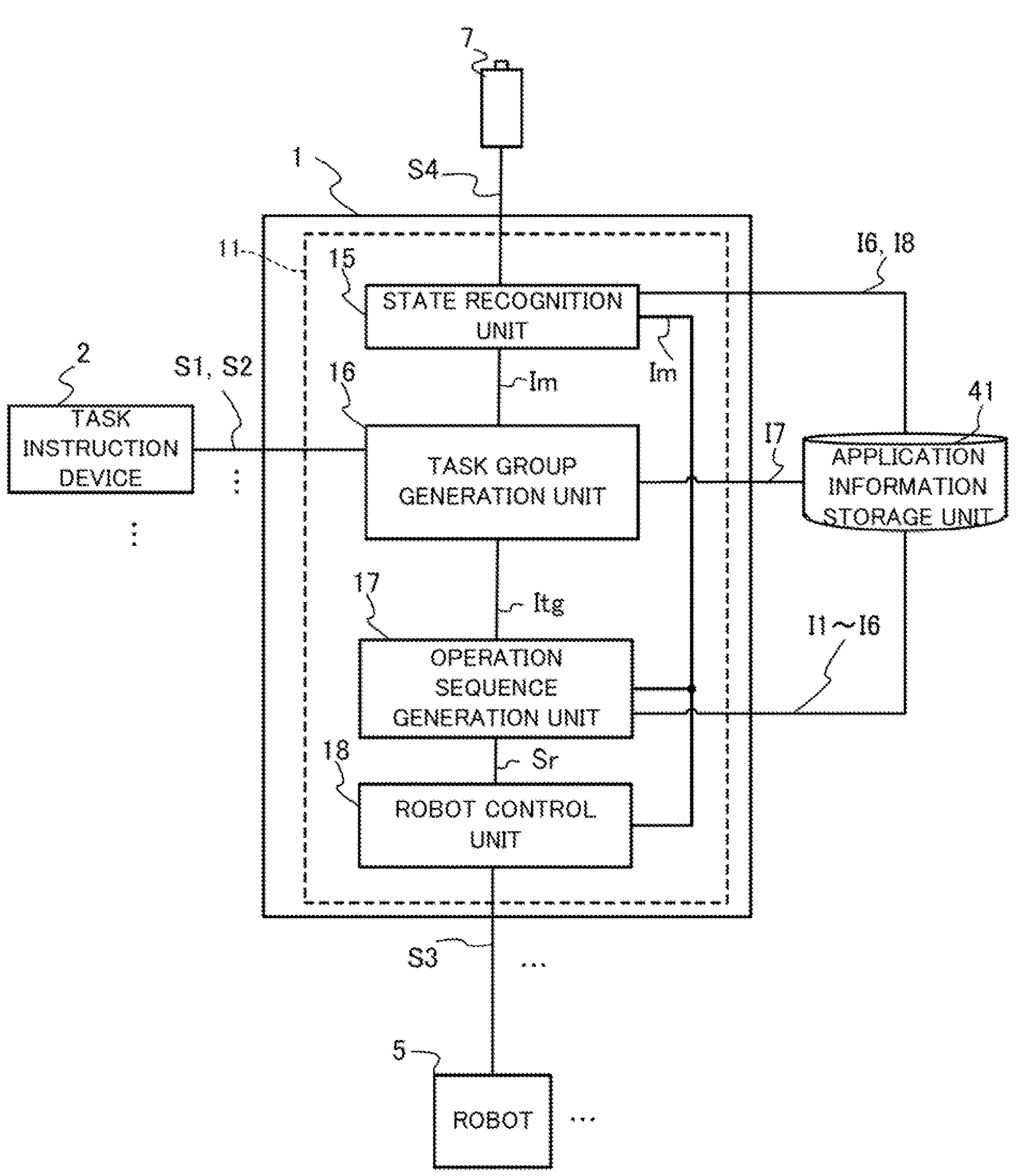
FIG. 4 is an example of a functional block of the control device according to the first example embodiment.

FIG. 4 is an example of a functional block showing an outline of the process executed by the control device 1. The processor 11 of the control device 1 functionally includes a state recognition unit 15, a task group generation unit 16, an operation sequence generation unit 17, and a robot control unit 18. In FIG. 4, although an example of data to be exchanged between the blocks is shown, the data to be exchanged is not limited thereto. The same applies to other functional block diagrams to be described later.

The state recognition unit 15 recognizes the state of the workspace of the robots 5 based on the output signal S4 supplied from the measurement device 7, the object model information I6, the work space information I8, and the like. Then, the state recognition unit 15 supplies information (also referred to as "state information Im") relating to the recognized state of the workspace of the robots 5 to other components. In this case, for example, when receiving the output signal S4, the state recognition unit 15 refers to the object model information I6 and/or the like and analyzes the output signal S4 by using a technique (e.g., an image processing technique, an image recognizing technique, a speech recognition technique, a technique using a RFID (Radio Frequency Identifier)) for recognizing the state of the workspace. Thereby, the state recognition unit 15 recognizes the number of objects, related to the execution of the tasks, in the workspace for each object type, the position of each object, and the posture of each object, and then generates the state information Im including the recognition result. Furthermore, by referring to the workspace information I8, the state recognition unit 15 recognizes the state of the workspace (including the blind spot from the measurement device 7) in which the measurement device 7 cannot measure, and includes the recognition result in the state information Im.

It is noted that the measurement device 7 may have a function corresponding to the state recognition unit 15. In this case, the measurement device 7 supplies the control device 1 with the generated state information Im in place of or in addition to the output signal S4.

The task group generation unit 16 generates one or more groups (also referred to as "task groups") into which all target tasks are classified according to task type, wherein tasks to be completed at the same timing are classified into the same task group. In this case, first, the task group generation unit 16 generates the display information S2 for displaying a view in which the operator designates the tasks to be performed by the robots 5, and transmits the display information S2 to a task instruction device 2 via the interface 13. The task group generation unit 16 receives the input information S1 related to the tasks designated on the above-mentioned view from the task instruction device 2 through the interface 13. The task group generation unit 16 generates one or more task groups from all target tasks identified by the received input information S1 by referring to the task classification information I7. Each task group includes at least one task. Then, the task group generation unit 16 supplies task group information "Itg", which is information relating to the generated task groups, to the operation sequence generation unit 17. The task group information Itg includes, for example, information specifying each of all target tasks and identification information of the task group to which each task belongs.

Based on the state information Im, the task group information Itg, and the application information, the operation sequence generation unit 17 generates subtask sequences "Sr" to be executed by the respective robots 5 to complete all target tasks. In this case, the operation sequence generation unit 17 generates the subtask sequences Sr for completing the tasks designated by the task instruction device 2 so as to put the task completion time (i.e., the task completion timings) of the tasks close to one another with respect to each task group. In this case, for example, the operation sequence generation unit 17 generates the subtask sequences Sr by performing optimization using such a constraint condition that the difference between the completion time of any two tasks which belong to a common task group is within a predetermined time difference. In another example, the operation sequence generation unit 17 generates the subtask sequences Sr by performing optimization using an objective function that includes at least a term representing the variation in the completion time of tasks with respect to each task group. Then, the operation sequence generation unit 17 supplies the generated subtask sequences Sr to the robot control unit 18. Here, each subtask sequences Sr include information indicating the execution order and execution timing of each subtask.

The robot control unit 18 performs control for the robots 5 to execute each subtask included in the subtask sequences Sr at the predetermined execution timing (at predetermined time step) on the basis of the subtask sequences Sr supplied from the operation sequence generation unit 17. Specifically, the robot control unit 18 executes the position control or torque control of the joints of each robot 5 for realizing the corresponding subtask sequence Sr by transmitting the control signal S3 to each robot 5. Further, if a new subtask sequences Sr are supplied from the operation sequence generation unit 17 during control of the robots 5 based on the subtask sequences Sr, the robot control unit 18 performs operation control of the robots 5 based on the newly supplied subtask sequences Sr.

The robots 5 may be equipped with the function corresponding to the robot control unit 18 in place of the control device 1. In this case, each robot 5 receives a subtask sequence Sr from the operation sequence generation unit 17 and executes position control or torque control of the joints for realizing the subtask sequence Sr.

Each component of the state recognition unit 15, the task group generation unit 16, the operation sequence generation unit 17, and the robot control unit 18 described in FIG. 4 can be realized, for example, by the processor 11 executing the program. More specifically, each component may be implemented by the processor 11 executing a program stored in the memory 12. In addition, the necessary programs may be recorded in any nonvolatile recording medium and installed as necessary to realize each component. Each of these components is not limited to being implemented by software using a program, and may be implemented by any combination of hardware, firmware, and software. Each of these components may also be implemented using user programmable integrated circuit, such as, for example, FPGA (field-programmable gate array) or a microcomputer. In this case, the integrated circuit may be used to realize a program to function as each of the above-described components. Thus, each component may be implemented by hardware other than the processor. The above is the same in other example embodiments to be described later.

(5) Details of Task Group Generation Unit

Next, the details of the process to be executed by the task group generation unit 16 will be described. The task group generation unit 16 generates task groups considering at least one of: the timing at which each task is designated; the category to which each designated task belongs; or the input information S1 which specifies the tasks whose completion time are to be synchronized.

Hereinafter, as an example, a specific description with reference to the display examples shown in FIGS. 5 and 6 will be given of the method of generating task groups when each order corresponding to one order item is set as a task in the provision of food and beverages.

Figure 5:
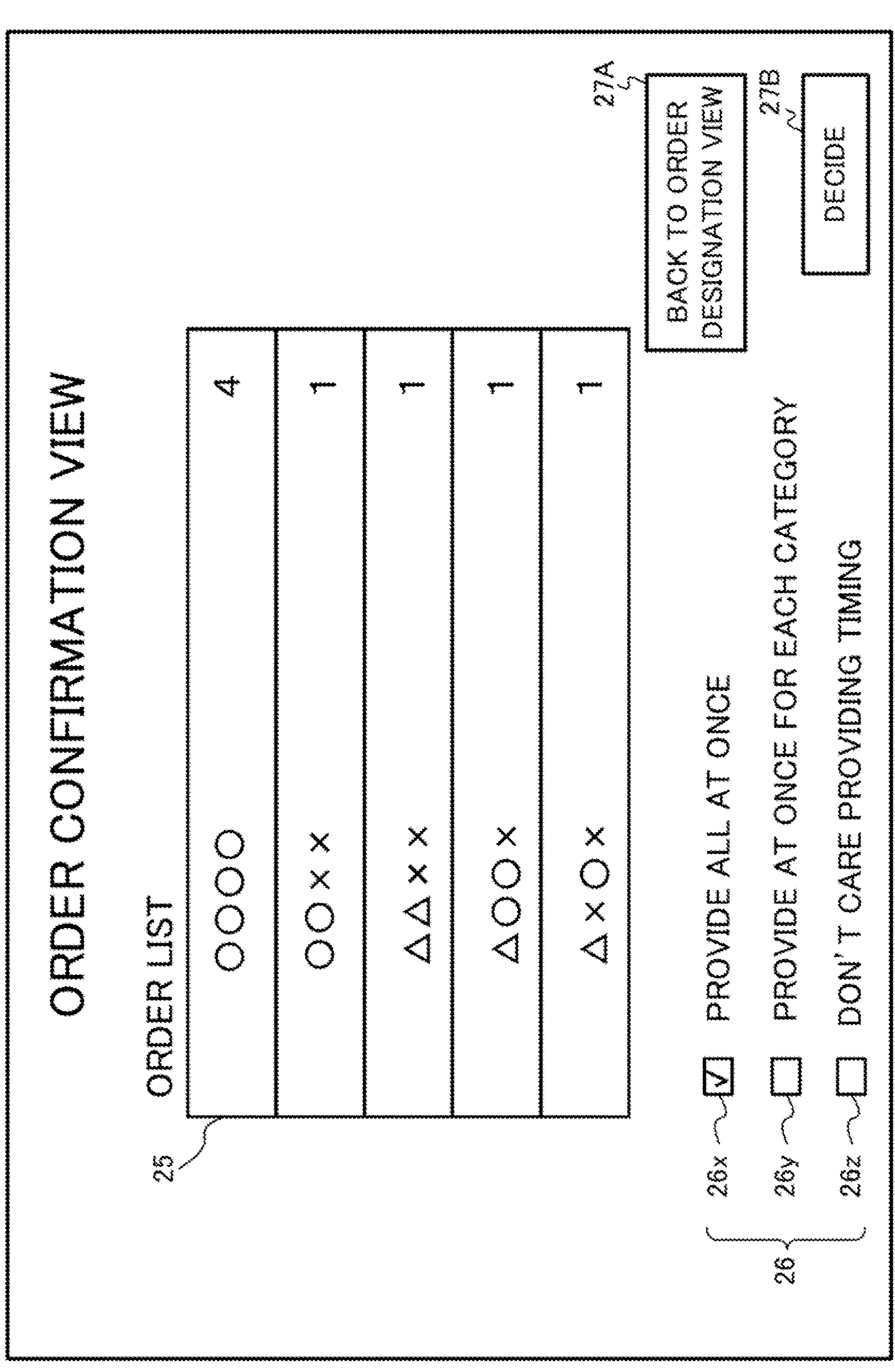
FIG. 5 is a first display example of an order confirmation view.

FIG. 5 is a first display example of the order confirmation view. The task group generation unit 16 generates the display information S2 and transmits the display information S2 to a task instruction device 2, thereby causing the task instruction device 2 to display the order confirmation view shown in FIG. 5. In this case, the task instruction device 2 is, for example, an order tablet terminal placed on each table (seat) arranged in a restaurant, and it accepts an order corresponding to multiple items at the same time.

The order confirmation view shown in FIG. 5 mainly includes an order list field 25, a providing timing selection button 26, a back button 27A for getting back to the order designation view for designating an order, and a decision button 27B for confirming the order.

The order list field 25 is a list of the names of order items specified by the user input on the order designation view before the transition to the order confirmation view, together with the number of orders. The providing timing selection buttons 26 are radio buttons for accepting a designation relating to the providing timing of each order item listed in the order list field 25 and includes a first button 26*x*, a second button 26*y*, and a third button 26*z*. Here, the first button 26*x* is a button for requesting all order items listed in the order list field 25 to be provided all at once. Further, the second button 26*y* is a button for requesting the order items listed in the order list field 25 to be provided at the same time with respect to each category. The third button 26*z* is a button for specifying that there is no request for the delivery timing of the orders listed in the order list field 25.

Here, when the decision button 27B is selected while the first button 26*x* is being selected, the task group generation unit 16 recognizes, based on the input information S1 received from the task instruction device 2, that all of the order items listed in the order list field 25 should be provided at the same timing. In this case, first, the task group generation unit 16 recognizes tasks indicative of transferring the order items listed in the order list field 25 to the table in which the target task instruction device 2 is installed. In the first display example, the task group generation unit 16 recognizes that eight tasks in total corresponding to the number (eight) of order items listed in the order list field 25 have been designated. The task group generation unit 16 generates a task group in which these recognized tasks are grouped together. As described above, when the first button 26*x* is selected, the task group generation unit 16 regards a plurality of tasks designated at the same timing from the same task instruction device 2 as one task group.

In contrast, when the decision button 27B is selected while the second button 26*y* is being selected, the task group generation unit 16 recognizes, based on the input information S1 received from the task instruction device 2, that the order items listed in the order list field 25 should be provided at the same timing with respect to each category. In this case, by referring to the task classification information I7, the task group generation unit 16 classifies eight tasks in total corresponding to the number of order items listed in the order list field 25, and generates task groups corresponding to sets of tasks having the same category. For example, when four orders corresponding to the item "○○○○" belongs to the first category (e.g., main dish) and the other four orders belong to the second category (e.g., dessert), the task group generation unit 16 generates a task group of the tasks belonging to the first category and another task group of the tasks belonging to the second category, respectively. As described above, when the second button 26*y* is selected, the task group generation unit 16 generates one or more task groups into which a plurality of tasks designated from the same task instruction device 2 at the same timing are classified according to the category of each task.

Further, when the decision button 27B is selected while the third button 26*z* is being selected, the task group generation unit 16 recognizes, based on the input information S1 received from the task instruction device 2, that the timing of providing the order items listed in the order list field 25 need not to be synchronized. In this case, the task group generation unit 16 regards each of the tasks corresponding to each of the order items listed in the order list field 25 as a task group configured by one task, and generates the same number of task groups as the number of the task.

Thus, according to the first display example, the task group generation unit 16 can suitably generate one or more task groups from the designated tasks based on at least one of the designated timings of the tasks or the categories of the tasks.

Figure 6:
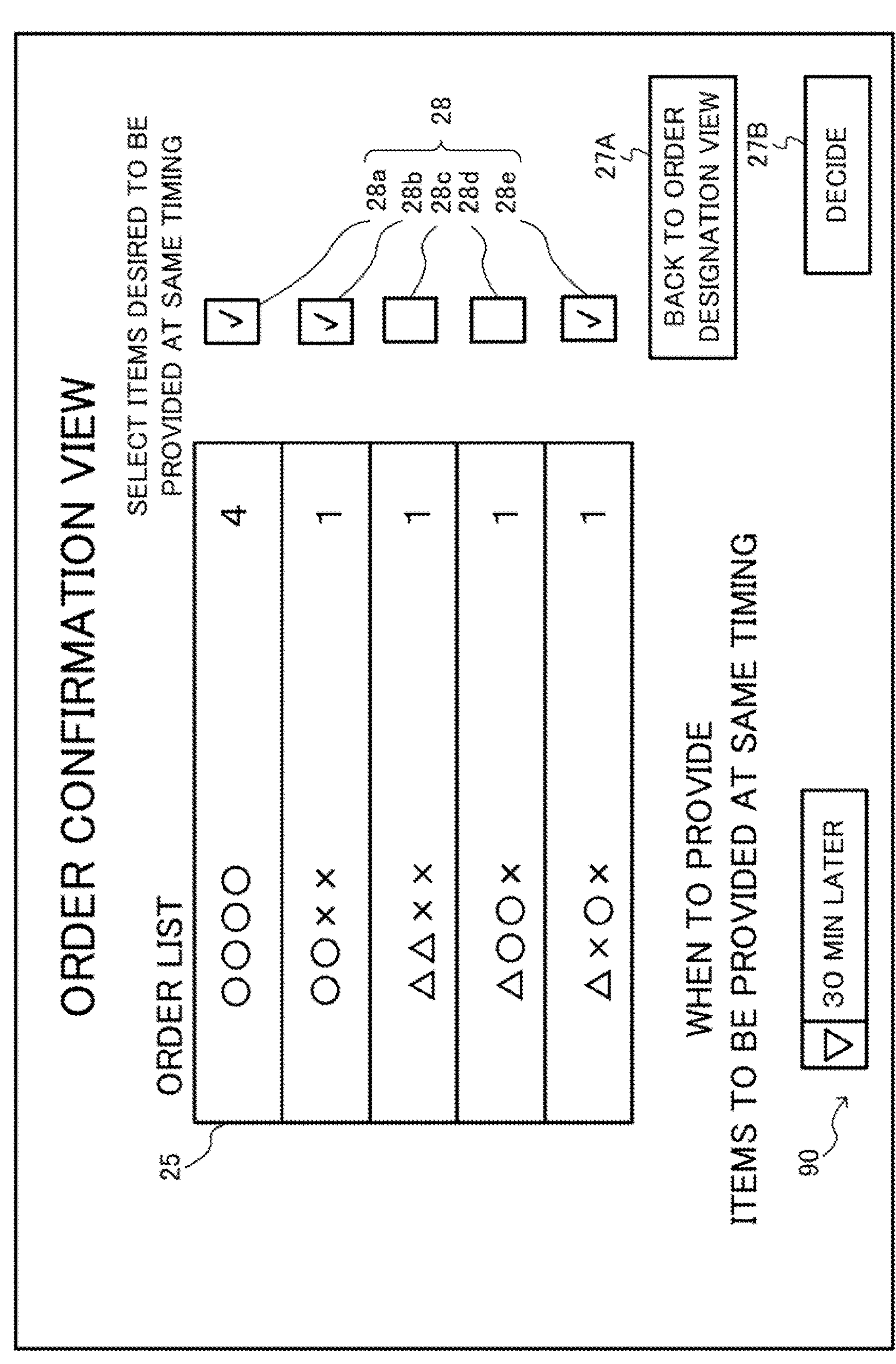
FIG. 6 is a second display example of the order confirmation view.

FIG. 6 is a second display example of the order confirmation view. The task group generation unit 16 generates the display information S2 and transmits the display information S2 to the task instruction device 2, thereby causing the task instruction device 2 to display the order confirmation view shown in FIG. 6. In the second display example, the task group generation unit 16 displays an order list field 25, a group selection buttons 28 (28*a* to 28*e*), a back button 27A, a decision button 27B, and a providing timing designation field 90 on the order confirmation view.

The group select buttons 28 (28*a* to 28*e*) are checkboxes for each element of the list of the order items and accept selections of order items that are desired to be provided at the same time. In the example of FIG. 6, group selection buttons 28*a*, 28*b*, and 28*e* corresponding to three elements of the list of orders are being selected. In this case, the task group generation unit 16 recognizes, on the basis of the input information S1 supplied from the task instruction device 2, that four order of the item "○○○○", one order of the item "○○××" and one order of the item "Δ×○×" should be provided at the same time. Therefore, in this case, the task group generation unit 16 generates a task group configured by six tasks in total for providing four order of the item "○○○○", one order of the item "○○××", and one order of the item "Δ×○×". The task group generation unit 16 also generates the task groups corresponding to the tasks for providing other orders of the items "ΔΔ××" and "Δ○○×", respectively. The above-mentioned task groups each includes a single task.

Further, the providing timing designation field 90 is a field for selecting the providing timing of the order items desired to be provided at the same time. Here, as an example, the providing timing designation field 90 is a selection field in the form of the pull-down menu format for accepting the designation of the time length (30 minutes in FIG. 6) to be taken for providing the order items desired to be provided at the same time. Based on the input information S1, the task group generation unit 16 recognizes the time length specified by the providing timing designation field 90 as the work expected time length of the target task group and supplies the recognized work expected time length to the operation sequence generation unit 17. Thereafter, the operation sequence generation unit 17 generates operation sequences so as to match the work completion time of the tasks of the target task group with the work expected completion time determined by the supplied work expected time length.

As described above, according to the second display example, the task group generation unit 16 can suitably generate task groups so that tasks selected from a plurality of tasks designated at the same timing by the task instruction device 2 belong to a same task group. Furthermore, according to the second display example, the task group generation unit 16 can suitably receive the designation of the work expected time length (i.e., the expected time for completion of the work) of the target task group.

It is noted that the task instruction device 2 may display, based on the display information S2 supplied from the control device 1, a view for accepting the input of deletion or addition of ordered items (including the change of the number thereof), and then transmit the input information S1 indicative of the deletion or addition of ordered items to the control device 1. In this case, the task group generation unit 16 of the control device 1 changes the generated task groups based on the input information S1 indicative of the deletion or the addition of the ordered items, and supplies the task group information Itg indicative of the changed task groups to the robot control unit 18. The change in the task groups in this case includes adding or deleting one or more task groups and deleting or adding one or more tasks for a task group.

(6) Details of Operation Sequence Generation Unit

Next, details of the process executed by the operation sequence generation unit 17 will be described.

(6-1) Functional Block

Figure 7:
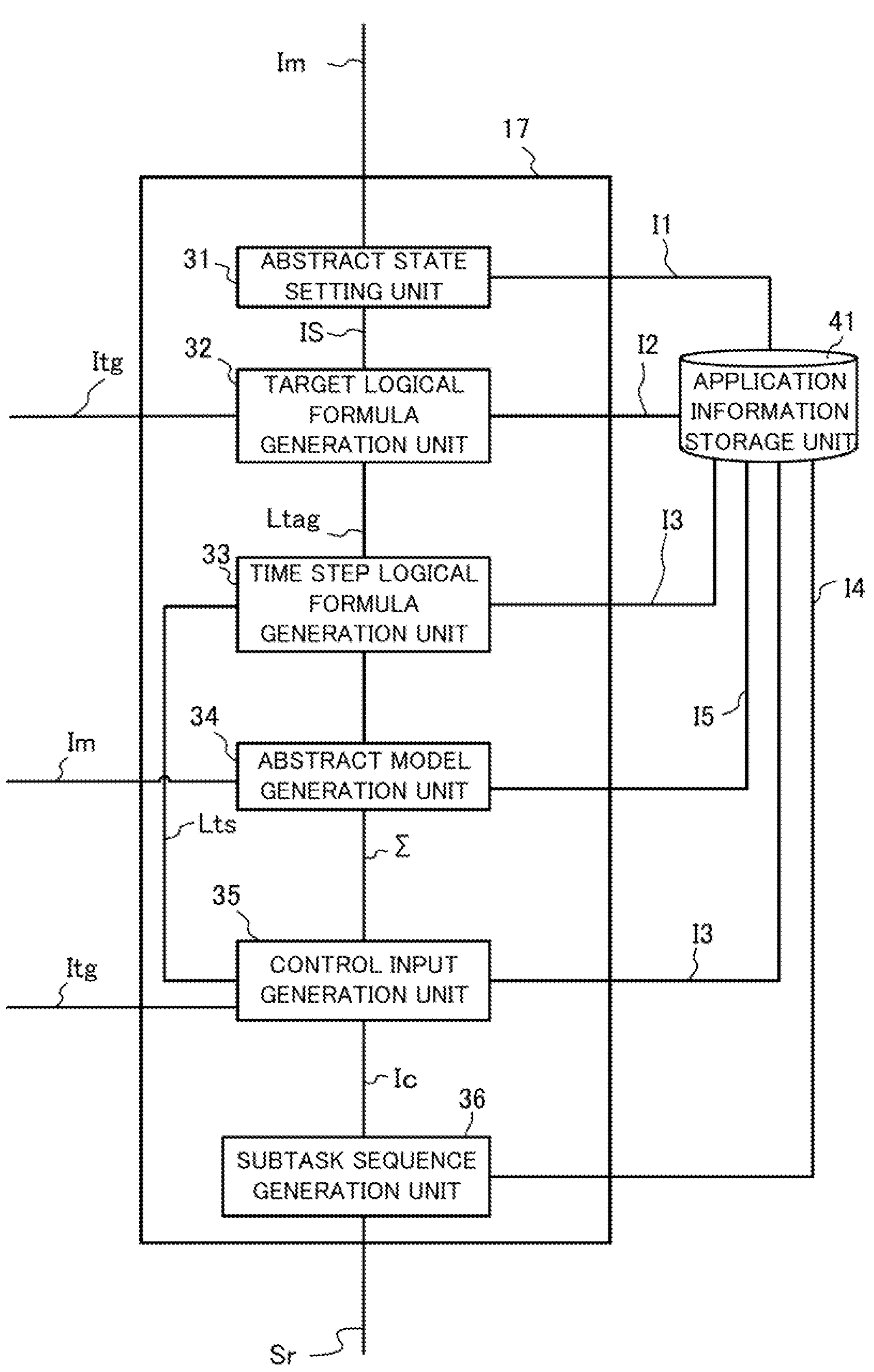
FIG. 7 is an example of a functional block indicative of the functional configuration of an operation sequence generation unit.

FIG. 7 is an example of a functional block showing the functional configuration of the operation sequence generation unit 17. The operation sequence generation unit 17 functionally includes an abstract state setting unit 31, a target logical formula generation unit 32, a time step logical formula generation unit 33, an abstract model generation unit 34, a control input generation unit 35, and a subtask sequence generation unit 36.

The abstract state setting unit 31 sets abstract states in the workspace based on the state information Im supplied from the task group generation unit 16 and the abstract state specification information I1. In this case, based on the state information Im, the abstract state setting unit 31 defines a proposition to be expressed in a logical formula for each abstract state that needs to be considered when executing tasks. The abstract state setting unit 31 supplies information (also referred to as "abstract state setting information IS") indicating the set abstract state to the target logical formula generation unit 32.

Based on the abstract state setting information IS and the task group information Itg, the target logical formula generation unit 32 generates a logical formula (also referred to as "target logical formula Ltag") in the form of a temporal logic representing the final state to be achieved. In this case, by referring to the constraint condition information I2 from the application information storage unit 41, the target logical formula generation unit 32 adds the constraint condition to be satisfied in executing the tasks to the target logical formula Ltag. In addition, when the constraint condition based on the proximity of the completion time of tasks with respect to each task group is to be defined, the target logical formula generation unit 32 refers to the task group information Itg and adds, to the target logical formula Ltag, the constraint condition in which the completion time of the tasks with respect to each task group are equal or different by less than a predetermined time length. Then, the target logical formula generation unit 32 supplies the generated target logical formula Ltag to the time step logical formula generation unit 33.

The time step logical formula generation unit 33 convers the target logical formula Ltag supplied from the target logical formula generation unit 32 to the logical formula (also referred to as "time step logical formula Lts") representing the state at each time step. Then, the time step logical formula generation unit 33 supplies the generated time step logical formula Lts to the control input generation unit 35.

On the basis of the abstract model information I5 stored in the application information storage unit 41 and the state information Im supplied from the abstract state setting unit 31, the abstract model generation unit 34 generates an abstract model "Σ" in which the real dynamics in the workspace 6 are abstracted. In this case, the abstract model generation unit 34 considers the target dynamics as a hybrid system in which the continuous dynamics and the discrete dynamics are mixed, and generates an abstract model Σ based on the hybrid system. The method for generating the abstract model Σ will be described later. The abstract model generation unit 34 supplies the generated abstract model Σ to the control input generation unit 35.

The control input generation unit 35 determines a control input for each robot 5 for each time step, wherein the control input is determined to optimize the objective function (e.g., a function representing the degree of variation in the completion time) while satisfying the time step logical formula Lts supplied from the time step logical formula generation unit 33 and the abstract model Σ supplied from the abstract model generation unit 34. If the optimization is performed based on the proximity of the completion time of tasks with respect to each task group, the control input generation unit 35 refers to the task group information Itg and recognizes one or more task groups which include two or more tasks. Then, the control input generation unit 35 sets an objective function including at least a term relating to the variation in the completion time of the tasks with respect to each of the recognized task groups, and obtains the control input to each robot 5 by optimization. Then, the control input generation unit 35 supplies information (also referred to as "control input information Ic") indicating the control input for each robot 5 for each time step to the subtask sequence generation unit 36.

The subtask sequence generation unit 36 generates the subtask sequences Sr based on the control input information Ic supplied from the control input generation unit 35 and the subtask information I4 stored in the application information storing unit 41, and supplies the subtask sequences Sr to the operation sequence generation unit 17.

(6-2) Abstract State Setting Unit

The abstract state setting unit 31 sets abstract states in the workspace based on the state information Im and the abstract state specification information I1 acquired from the application information storage unit 41. In this case, first, the abstract state setting unit 31 refers to the abstract state specification information I1 and recognizes the abstract states to be set in the workspace.

Figure 8:
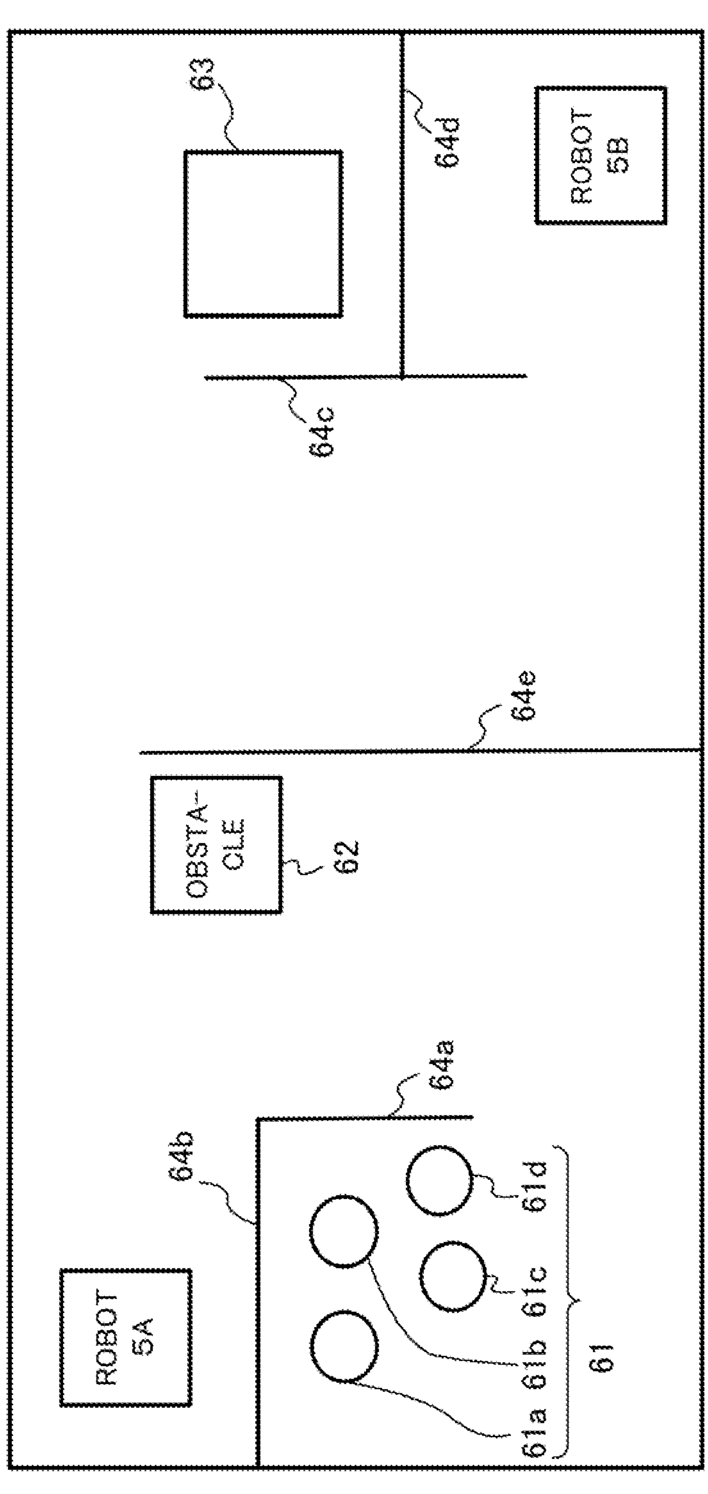
FIG. 8 illustrates a plane view of the workspace.

FIG. 8 shows a bird's-eye view of the workspace. In the workspace shown in FIG. 8, there are two robots 5 (5A, 5B), objects 61 (61*a* to 61*d*) to be conveyed by the robot 5, an obstacle 62, a destination area 63, and walls 64 (64*a* to 64*e*). Here, each of the robots 5 is a self-propelled robot, and is assumed to be capable of transporting up to two objects 61.

In this case, based on the state information Im, the abstract state setting unit 31 recognizes the position and the configuration (form) of the robots 5, the objects 61, the obstacle 62, the destination area 63, and the walls 64. By referring to the abstract state specification information I1, the abstract state setting unit 31 determines the abstract states to be defined when executing the tasks. In the example of FIG. 8, the abstract state setting unit 31 assigns identification labels to the robots 5, the objects 61, the obstacle 62, the destination area 63 and the walls 64, respectively. Further, based on the abstract state specification information I1, the abstract state setting unit 31 defines each proposition to be used in the target logical formula such as a proposition indicating that an object 61 is mounted on a robot 5, a proposition indicating that an object 61 is present in the destination area 63, a proposition indicating that the robots 5 do not interfere with each other, and a proposition indicating that any robot 5 does not interfere with the obstacle 62 or any wall 64.

In this way, the abstract state setting unit 31 recognizes the abstract states to be defined by referring to the abstract state specification information I1, and defines propositions representing the abstract states according to the number of robots 5, the number of the objects 61, the number of the obstacles 62, the number of the walls 64, and the like. The abstract state setting unit 31 supplies the information indicative of the propositions representing the abstract states to the target logical formula generation unit 32 as the abstract state setting information IS.

(6-3) Target Logical Formula Generation Unit

The target logical formula generation unit 32 converts all tasks included in the task groups indicated by the task group information Itg into logical formulas using the temporal logic. When a task is expressed by natural language, there are various techniques relating to natural language processing for converting a task expressed by natural language into a logical formula. For example, in the example of FIG. 8, it is herein assumed that a task indicative of the proposition "g" which means "the object 61*a* is finally present in the destination area 63" is given to the target logical formula generation unit 32. In this case, the target logical formula generation unit 32 generates the logical formula "◇g" by using the operator "◇" corresponding to "eventually" of the LTL (Linear Temporal Logic) and the proposition "g" defined by the abstract state setting unit 31. Then, the target logical formula generation unit 32 generates a logical formula in which propositions corresponding to all target tasks are combined by logical AND based on the task group information Itg.

The target logical formula generation unit 32 may express logical formula by using any operators based on the temporal logic other than the operator "◇" such as logical AND "∧", logical OR "∨", negative "¬", logical implication "⇒", always "□", next "○", until "U", and the like). The logical formula may be expressed by any temporal logic other than linear temporal logic such as MTL (Metric Temporal Logic) and STL (Signal Temporal Logic).

The target logical formula generation unit 32 generates the target logical formula Ltag by adding the constraint condition indicated by the constraint condition information I2 to the logical formula indicating the above-described tasks. For example, if the constraint condition information I2 includes such constraint conditions "the robot 5A and the robot 5B do not interfere with each other" and "the robots 5A and 5B do not interfere with the obstacle 62 nor the walls 64" according to the example of FIG. 8, the target logical formula generation unit 32 converts these constraint conditions into one or more logical formulas. Then, target logical formula generation unit 32 generates the target logical formula Ltag by adding the converted logical formulas corresponding to the constraint conditions to the logical formula corresponding to the tasks.

In addition, when a constraint condition relating to the proximity (closeness) of the completion time of the tasks with respect to each task group is to be defined, the target logical formula generation unit 32 refers to the task group information Itg and recognizes one or more task groups including two or more tasks. Then, the target logical formula generation unit 32 applies the constraint condition in which the completion time of the tasks for each of the recognized task groups is equal or different by less than a predetermined time length. In this case, in some embodiments, the target logical formula generation unit 32 firstly sets a strict constraint condition with respect to the proximity of the completion time of the tasks for each task group. Then, if there is no solution in the optimization process to be described later, the target logical formula generation unit 32 resets the constraint conditions to ease the above-mentioned constraint condition. For example, the target logical formula generation unit 32 sets such a constraint condition that the time difference of the completion time of the tasks for each task group becomes 0 (i.e., the completion time matches) as the constraint condition to be set firstly. When there is no solution in the optimization process to be described later, the target logical formula generation unit 32 raises the upper limit of the above-described time difference by a predetermined value, and performs the optimization process again. Then, the target logical formula generation unit 32 repeats the addition of a predetermined value to the upper limit of the time difference described above until the solution is found in the optimization process. In this way, the target logical formula generation unit 32 can suitably put the completion time of the tasks for each task group closer to one another.

(6-4) Time Step Logic Formula Generation Unit

The time step logical formula generation unit 33 defines the number (also referred to as the "target time step number") of time steps for completing all tasks included in the task groups indicated by the task group information Itg, and determines one or more combinations of propositions representing the state at each time step such that the target logical formula Ltag is satisfied with the target time step number. Since the combinations are normally plural, the time step logical formula generation unit 33 generates a logical formula obtained by combining these combinations by logical OR as the time step logical formula Lts. Each of the combinations described above is a candidate of a logical formula representing a sequence of operations to be instructed to each of the robots 5, and therefore it is hereinafter also referred to as "candidate φ". In this case, the time step logical formula Lts is true when at least one of the generated candidates φ is true. The time step logical formula generation unit 33 may determine the feasibility of each of the generated candidates based on the operation limit information I3 and exclude such a candidate φ determined to be unfeasible from the generated candidates.

The time step logic type generation unit 33 may determine the target time step number based on the work expected time length (i.e., the expected time of the work completion) specified by the user input in the providing timing designation field 90 shown in FIG. 6, or may determine the target time step number to be a predetermined value stored in advance in the memory 12 or the storage device 4. In the former case, on the basis of the information, stored in the memory 12 or the storage device 4, indicative of the time width per one time step, the time step logical formula generation unit 33 calculates the target time step number from the work expected time length (i.e., the expected time of the work completion) specified by the user input to the task instruction device 2 or the user input to the control device 1. Thereafter, based on the target time step number, the operation sequence generation unit 17 generates the operation sequences such that the completion time of the tasks for each task group becomes closer to the designated expected time of the work completion. In another example, the time step logical formula generation unit 33 may determine the target time step number according to a predetermined calculation formula or a look-up table or the like in which the number of tasks and the number of robots 5 and the like are used as variables. In this case, when the information indicative of the required time per robot 5 to complete each task is stored in the memory 12 or the storage device 4, the time step logic generation unit 33 may further determine the target time step number in consideration of the above-mentioned required time.

Further, the time step logical formula generation unit 33 sets the target time step number to a predetermined initial value, and gradually increase the target time step number until it generates such a time step logical formula Lts that the control input generation unit 35 can determine the control input. In this case, if the time step logical formula generation unit 33 cannot derive the optimal solution through the optimization process executed by the control input generation unit 35 by use of the set target time step number, the time step logical formula generation unit 33 adds a predetermined number (1 or more integers) to the target time step number.

(6-5) Abstract Model Generation Unit

The abstract model generation unit 34 generates the abstract model Σ based on the state information Im and the abstract model information I5. Here, the information necessary for generating the abstract model Σ is recorded in the abstract model information I5. For example, in the case of a task needed to convey one or more object, an abstract model in a general format that does not specify the position and number of the objects, the position of the destination area for conveying the objects, the number of robots 5, and the like is recorded in the abstract model information I5. This abstract model may be represented by a difference equation indicative of the relation between the state of the objects in the workspace at time step "k" and the state of the objects in the workspace at time step "k+1". At this time, for example, the difference equation has variables such as a position vector indicating the positions of the objects and a position vector of the robots 5. Then, the abstract model generation unit 34 generates the abstract model Σ by reflecting the state (number, position, posture, etc.,) of each object indicated by the state information Im in the abstract model in a general format recorded in the abstract model information I5.

Here, during the work of the tasks by the robots 5, the dynamics in the workspace is frequently switched. Therefore, the abstract model stored in the abstract model information I5 is a model in which the switching of the dynamics is abstractly expressed with logical variables. Therefore, the abstract model generation unit 34 can preferably represent the switching of the dynamics by the abstract model by abstractly expressing the event (operation), which causes the dynamics to switch, in the abstract model using the logic variable. For example, in the case where the task is a task needed to convey an object, the object moves with the robot 5 while the object is mounted on the robot 5, but when the object is not mounted on the robot 5, the object does not move. Therefore, in this case, the abstract model generation unit 34 abstractly expresses the operation of placing an object on the robot 5 in the abstract model using a logic variable.

Thus, by referring to the abstract model information I5, the abstract model generation unit 34 sets the abstract model Σ in which the dynamics in the workspace is abstracted by a hybrid system, in which the switching of the dynamics is represented by a logic variable that is a discrete value and in which the movement of an object is represented by a continuous value. Here, when the abstract model Σ is represented by a difference equation indicating the state relationship of an object in the workspace at the time steps "k" and "k+1", the difference equation includes a position vector or the like representing the state of the object, a variable representing a control input to the robot 5 (parameter), and a logic variable representing the switching of the dynamics.

The abstract model Σ represents an abstracted dynamics rather than the detailed dynamics of the entire robots 5. For example, if the robot 5 has a robot arm for grasping an object, only the dynamics of the robot hand, that is the hand of the robot 5 for actually grasping the object, may be expressed in the abstract model Σ. Thus, it is possible to suitably reduce the calculation amount of the optimization process by the control input generation unit 35.

It is noted that the abstract model generation unit 34 may generate a model of a MLD (Mixed Logical Dynamical) system or any other hybrid system in which Petri nets, automaton or the like are combined.

(6-6) Control Input Generation Unit

The control input generation unit 35 determines the optimal control input for each robot 5 with respect to each time step based on the time step logical formula Lts supplied from the time step logical formula generation unit 33 and the abstract model Σ supplied from the abstract model generation unit 34. In this case, the control input generation unit 35 defines an objective function for all target tasks and solves the optimization problem of minimizing the objective function using the abstract model Σ and the time step logical formula Lts which function as constraint conditions. The objective function is stored in the memory 12 or the storage device 4.

Here, the objective function is designed, for example, to minimize the energy spent by the robots 5. In the example of the workspace shown in FIG. 8, the control input generation unit 35 defines an objective function so that the distance "$d_k$" between an object 61 and the destination area 63, the control input "$u_{kA}$" for the robot 5A, and the control input "$u_{kB}$" for the robot 5B are minimized. Specifically, the control input generation unit 35 defines the objective function that is the sum of the square of the norm of distance $d_k$ in all time steps and the square of the norm of the control input $u_{kA}$ in all time steps and the square of the norm of the control input $u_{kB}$ in all time steps. The control input $u_{kA}$ and the control input $u_{kB}$ may be a velocity or may be an acceleration.

In addition, in a case where the proximity of the completion time of tasks with respect to each task group is optimized, the control input generation unit 35 sets an objective function including at least a term representing the variation in the completion time of the tasks with respect to each task group. For example, the control input generation unit 35 refers to the task group information Itg thereby to recognize one or more task groups including two or more tasks, and determines an objective function obtained by adding up the variance of the completion time of the tasks with respect to each of the recognized task groups. In this example of the workspace shown in FIG. 8, one example of the objective function is the sum of: the square of the norm of the distance $d_k$ at all time steps; the square of the norm of the control input $u_{kA}$ at all time steps; the square of the norm of the control input $u_{kB}$ at all time steps; and the variance of task completion time in each task group including more than one task. In this case, the control input generation unit 35 may multiply the term of the distance $d_k$, the term of the control input $u_{kA}$, the term of the control input $u_{kB}$, and the term of the variance of the task completion time by respective predetermined weighting coefficients.

Thus, by adding an item relating to the variation in the task completion time for each task group to the objective function, the control input generation unit 35 can suitably determine the control input to each robot 5 so as to put the completion time of tasks included in a task group closer to one another.

Then, using the determined objective function, the control input generation unit 35 solves the constrained mixed integer optimization problem whose constraint conditions are determined by the abstract model Σ and the time-step logical formula Lts (that is, the logical OR of the candidates $\varphi_i$). In some embodiments, the control input generation unit 35 may reduce the calculation amount by approximating the logic variable by a continuous value and setting a continuous relaxation problem. When the STL is adopted instead of the linear temporal logic (LTL), it can be described as a nonlinear optimization problem. Thus, the control input generation unit 35 calculates the control input $u_{kA}$ for the robot 5A and the control input $u_{kB}$ for the robot 5B, respectively.

Further, if the target time step number is long (e.g., larger than a predetermined threshold value), the control input generation unit 35 may set the time step number T to be used for optimization to a value (e.g., the threshold value described above) smaller than the target time step number. In this case, the control input generation unit 35 sequentially determines the control input $u_{kA}$ and the control input $u_{kB}$ by solving the above-mentioned optimization problem, for example, every time a predetermined number of time steps elapses.

In addition, if the task group generation unit 16 detects instructions to add or delete a task, the control input generation unit 35 solves the above-described optimization problem based on the time step logical formula Lts that is reset based on all target tasks after reflecting the instructions. Thereby, the control input $u_{kA}$ and the control input $u_{kB}$ and the subtask sequence Sr for each of the robots 5 are regenerated. Here, the above-described deletion of the task refers to deletion of a task group that has already been generated by the task group generation unit 16 or deletion of some of the tasks included in a task group. In addition, the above-described addition of the task refers to the addition of a task to a task group generated by the task group creation unit 16 or the addition of one or more tasks along with the generation of a new task group.

The control device 1 may consider that the earlier the instruction timing by the task instruction device 2 to execute a task is, the higher the priority to be executed becomes, and therefore cause the robots 5 to execute a newly instructed task after the completion of already instructed tasks. In this case, the control device 1 solves the above-described optimization problem and determines the subtask sequence Sr with respect to each task group instructed by the same task instruction device 2 at the same timing. At this time, the control device 1 determines the completion time and the completion state of the already instructed task group as the start time and the initial state of the newly instructed task group, and generates the subtask sequence Sr for the newly instructed task group. After detecting the completion of the already instructed task group for which the subtask sequence Sr has already been generated, the control device 1 may execute the process of generating the subtask sequence Sr for the newly instructed task group.

(6-7) Subtask Sequence Generation Unit

The subtask sequence generation unit 36 generates a subtask sequence based on the control input information Ic supplied from the control input generation unit 35 and the subtask information I4 stored in the application information storage unit 41. In this case, by referring to the subtask information I4, the subtask sequence generation unit 36 recognizes subtasks that the robots 5 can accept. Then, the subtask sequence generation unit 36 converts the control input to a robot 5 for each time step indicated by the control input information Ic into subtasks for the robot 5.

For example, when the conveyance of an object is made to be a task, a function indicating a subtask corresponding to the movement of a robot 5 is at least defined in the subtask information I4 as a subtask that can be accepted by the robot 5. In this case, for example, the function "Move" representing the movement of the robot 5 is a function whose arguments are: the initial state of the robot 5 before the function is executed; the final state of the robot 5 after the function is executed; the time required for executing the function; and a logical variable indicating the switching of the dynamics. Here, the function "Move" represents a state in which an object is loaded (i.e., a state in which the object is moved together with the object) when the logical variable is "1", and represents a state in which the object is not loaded when the logical variable is "0". In this case, the subtask sequence generation unit 36 determines the function "Move" based on the trajectory of the robot 5 determined by the control input for each time step indicated by the control input information Ic and the transition of the logical variable for each time step indicated by the control input information Ic.

In the case where the robot 5 has a robot arm for grasping an object, the subtask information I4 further includes information defining functions representing subtasks corresponding to the movement of the robot arm, grasping by the robot arm, and the like. Then, the subtask sequence generation unit 36 generates the subtask sequence Sr for each of the robots 5 from the control input information Ic.

(7) Processing Flow

Figure 9:
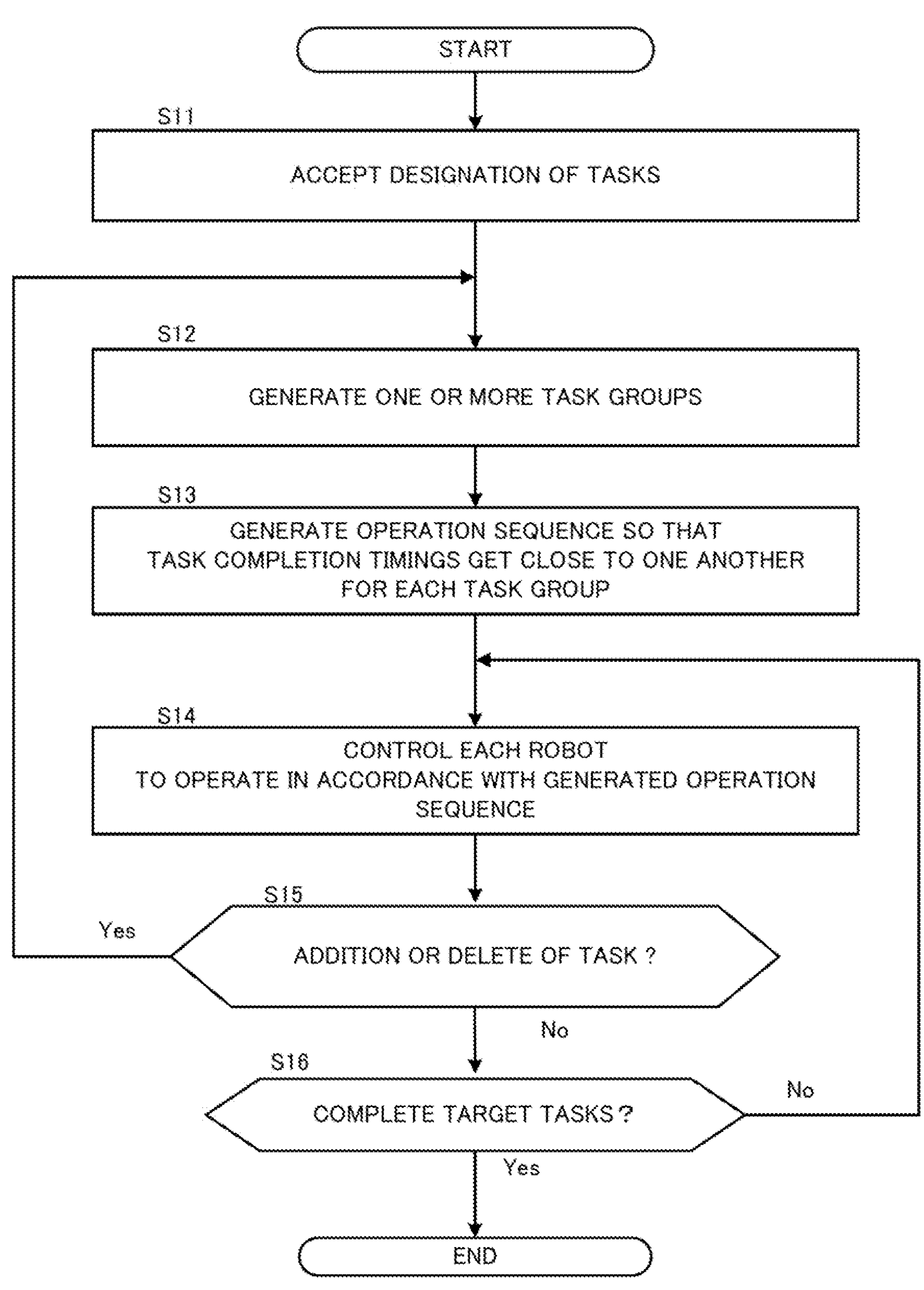
FIG. 9 is an example of a flowchart showing a control process performed by the control device in the first example embodiment.

FIG. 9 is an example of a flowchart showing a control process executed by the control device 1 in the first example embodiment.

First, the task group generation unit 16 of the control device 1 receives the designation of tasks based on the input information S1 supplied from a task instruction device 2 (step S11). In this case, first, the task group generation unit 16 transmits the display information S2 to the task instruction device 2 to display a view for designating the tasks on the task instruction device 2. The task group generation unit 16 recognizes all target tasks to be executed by receiving from the task instruction device 2 the input information S1 generated by the input operation on the view.

Then, the task group generation unit 16 generates one or more task groups obtained by classifying the tasks designated at step S11 (step S12). In this case, the task group generation unit 16 generates the task groups based on, for example, at least one of: the timing at which each task is designated; the category of each task indicated by the task classification information I7; or the user input on the task instruction device 2.

Next, the operation sequence generation unit 17 generates the operation sequence of each of the robots 5 so as to put the completion timings of tasks closer to one another for each task group generated by the task group generation unit 16 (Step S13). In this case, the operation sequence generation unit 17 generates the subtask sequence Sr based on the task group information Itg, the state information Im generated by the state recognition unit 15, and the application information relating to the configuration (form) and the motion characteristics of the robots 5. In this case, the operation sequence generation unit 17 may perform an optimization using at least such a constraint condition that the task completion time is equal to or within a predetermined time difference for each task group including two or more tasks, or may perform an optimization using an objective function including at least a term relating to the variation in the above-mentioned completion time for each task group.

After generating the subtask sequence Sr, the robot control unit 18 supplies the control signal S3 based on the generated subtask sequence Sr to each of the robots 5 and controls each of the robots 5 to operate according to the generated subtask sequence Sr (step S14).

Then, the task group generation unit 16 determines whether or not there are instructions to add or delete a task (step S15). In this case, when the task group generation unit 16 receives the input information S1 instructing the addition or deletion of a task from the task instruction device 2 by which the tasks were designated at step S11, or when it receives the input information S1 designating a task subject to addition or deletion from a task instruction device 2 other than the task instruction device 2 by which the tasks were designated at step S11, it determines that there are instructions to add or delete a task.

When there are instructions to add or delete a task (step S15; Yes), the control device 1 returns the process to step S12. In this case, the task group generation unit 16 changes the tasks included in one of the existing task groups or generates an additional task group, and the operation sequence generation unit 17 regenerates the subtask sequence Sr. In this case, when the task group is added, the operation sequence generation unit 17 may generate a sequence for executing the additional task group after executing the existing task groups. In this case, the operation sequence generation unit 17 generates a renewed subtask sequence Sr by adding the generated sequence to the existing subtask sequence Sr.

Then, the control device 1 determines whether or not the target tasks have been completed (step S16). In this case, for example, the control device 1 determines whether or not the target tasks is completed based on the state information Im generated from the output signal S4 by the state recognition unit 15 or a signal that notifies the completion of the target tasks supplied from the robots 5. When determining that the target tasks have been completed (step S16; Yes), the control device 1 terminates the processing of the flowchart. On the other hand, when determining that the target tasks have not been completed (step S16; No), the control device 1 returns the process to step S14.

Here, the effect according to the present invention will be supplementarily described.

Needs for introducing robots in various industries are increasing, and attempts have been made to apply robots to service industries such as a restaurant business. On the other hand, in the restaurant business and other businesses, it is considered that synchronizing the time of providing multiple products as much as possible will lead to customer satisfaction. In view of the above, the control device 1 according to the first example embodiment sets, as one task group, tasks whose completion time is desired to be synchronized, and generates an operation sequence of each robot so that the completion time of the tasks in the task group becomes closer to one other. Thereby, it is possible to improve the customer satisfaction suitably when robots are applied to the service industry such as a restaurant business.

(8) Modification

Next, a description will be given of modifications of the first example embodiment. The following modifications may be applied in arbitrary combination.

First Modification

Information on the execution results generated by some of the function blocks of the operation sequence generation unit 17 shown in FIG. 7 may be stored in advance in the application information storage unit 41. For example, information generated by the abstract state setting unit 31 and the abstract model generation unit 34 may be stored in advance in the application information storage unit 41.

Further, the application information includes in advance design information such as a flowchart indicating a processing procedure to be executed by each of the robots 5 for each task, and the operation sequence generation unit 17 may generate an operation sequence of each of the robots 5 by referring to the design information. A specific example for executing a task based on a task sequence designed in advance is disclosed in JP 2017-39170A. Even in such a case, the operation sequence generation unit 17 assigns the optimal tasks to each of the robots 5 so as to put the completion time of the tasks with respect to each task group close to one another, and determines the operation sequence of each of the robots 5.

Second Modification

The task group generation unit 16 does not need to generate a task group including only one task. That is, the task group generation unit 16 may generate only one or more task groups including at least two or more tasks.

In this case, the task group generation unit 16 generates, in the task group information Itg, flag information indicating that the task does not belong to any task group as the task group identification information for such a task that does not belong to any task group. Then, the operation sequence generation unit 17 refers to the task group information Itg and sets a constraint condition relating to the completion time of the tasks belonging to the task group or an objective function for minimizing the difference of the completion time with respect to each task group in the optimization for determining the control input of the robots 5. As a result, as in the first example embodiment described above, it is possible to suitably put the completion time of the tasks which are desired to be completed at the same time close to one another.

Second Example Embodiment

Figure 10:
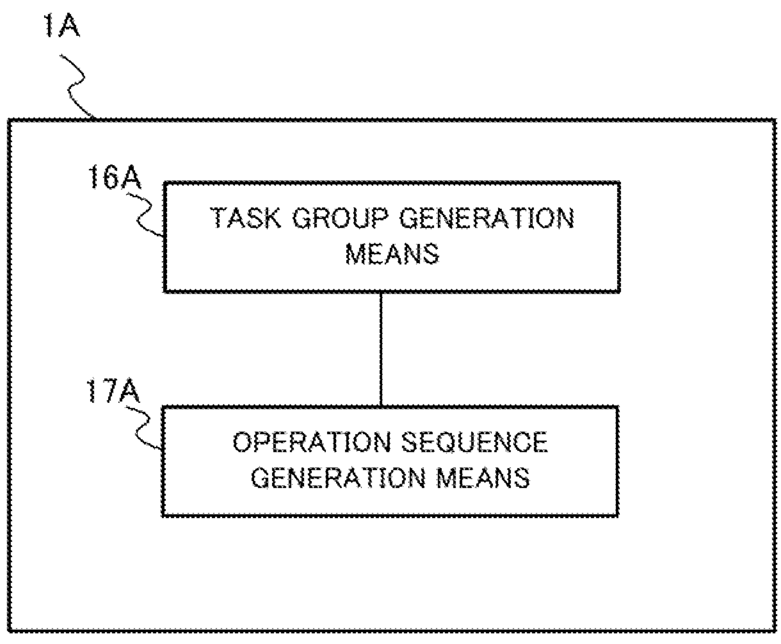
FIG. 10 illustrates a schematic configuration of a control device according to a second example embodiment.

FIG. 10 is a schematic configuration diagram of a control device 1A in the second example embodiment. As shown in FIG. 10, the control device 1A includes a task group generation means 16A and an operation sequence generation means 17A.

The task group generation means is configured to generate, in a case where multiple tasks to be executed by one or more robots are designated, one or more task groups obtained by classifying the multiple tasks. The above-mentioned plurality of tasks may configure one task group or may configure plural task groups. Examples of the task group generation means 16A include the task group generation unit 16 in the first example embodiment. It is noted that the task group generation means 16A may detect the designation of the tasks based on the information received from an external device, or may detect the designation based on the input to an input unit provided in the control device 1A, or may detect the designation by referring to a storage device that stores the tasks to be executed. The control device 1A may be incorporated as a part of the robots, or it may be configured separately from the robots.

The operation sequence generation means 17A is configured to generate one or more operation sequences of the one or more robots for completing the multiple tasks so as to put completion time of tasks included in the one or more task groups close to one another. This operation sequence can be the subtask sequence Sr in the first example embodiment. Examples of the operation sequence generation means 17A include the operation sequence generation unit 17 according to the first example embodiment.

Figure 11:
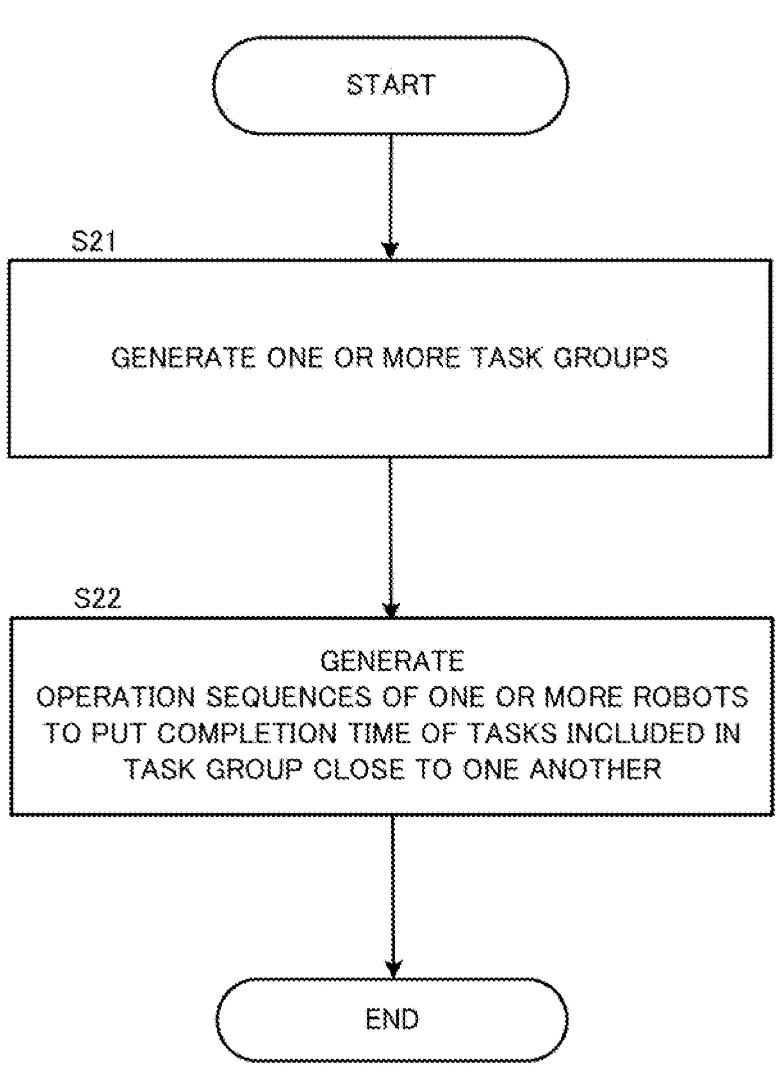
FIG. 11 is an example of a flowchart showing a control process in the second example embodiment.

FIG. 11 is an example of a flowchart in which the control device 1A executes in the second example embodiment. The task group generation means is configured to generate, in a case where multiple tasks to be executed by one or more robots are designated, one or more task groups obtained by classifying the multiple tasks (step S21). Then, the operation sequence generation means 17A is configured to generate one or more operation sequences of the one or more robots for completing the multiple tasks so as to put completion time of tasks included in the one or more task groups close to one another (step S22).

According to the configuration of the second example embodiment, the control device 1A can suitably determine the operation sequence of each robot so that the completion time of a particular task group becomes close to one another.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

A control device comprising:

a task group generation means configured to generate, in a case where multiple tasks to be executed by one or more robots are designated, one or more task groups obtained by classifying the multiple tasks; and an operation sequence generation means configured to generate one or more operation sequences of the one or more robots for completing the multiple tasks so as to put completion time of tasks included in the task group close to one another.

Supplementary Note 2

The control device according to Supplementary Note 1, wherein the operation sequence generation means is configured to generate the operation sequences by performing an optimization using such a constraint condition that the completion time of each of the tasks included in the task group coincides with one another or is within a predetermined time difference.

Supplementary Note 3

The control device according to Supplementary Note 1, wherein the operation sequence generation means is configured to generate the operation sequences by performing an optimization using an objective function including at least a term relating to a variation in the completion time of each of the tasks included in the task group.

Supplementary Note 4

The control device according to any one of Supplementary Notes 1 to 3, wherein the task group generation means is configured to generate the one or more task groups based on a timing at which each of the multiple tasks is designated.

Supplementary Note 5

The control device according to any one of Supplementary Notes 1 to 4, wherein the task group generation means is configured to generate the one or more task groups based on a category of each of the multiple tasks.

Supplementary Note 6

The control device according to any one of Supplementary Notes 1 to 5, wherein the operation sequence generation means is configured to generate the operation sequences so as to put the completion time of the tasks included in the task group close to a designated expected time of work completion.

Supplementary Note 7

The control device according to any one of Supplementary Notes 1 to 6, wherein, in a case of accepting a designation of the multiple tasks from a task instruction device, the task group generation means is configured to generate the one or more task groups by receiving, from the task instruction device, input information that designates, from the multiple tasks, tasks whose completion time is to be synchronized.

Supplementary Note 8

The control device according to any one of Supplementary Notes 1 to 7, wherein the operation sequence generation means is configured to regenerate the operation sequences when there are instructions to add or delete a task included in the task group.

Supplementary Note 9

The control device according to any one of Supplementary Notes 1 to 8, wherein, when an additional task group was generated by the task group generation means after generation of the operation sequences, the operation sequence generation means is configured to regenerate the operation sequences.

Supplementary Note 10

The control device according to any one of Supplementary Notes 1 to 9, wherein the operation sequence generation means is configured to generate the operation sequences based on at least one of information relating to a configuration of the one or more robots, information relating to a motion characteristic of the one or more robots, or state information indicating a state of a workspace in which the one or more robots operate.

Supplementary Note 11

The control device according to any one of Supplementary Notes 1 to 10, wherein the operation sequence generation means comprises:

a logical formula conversion means configured to convert the multiple tasks to a logical formula based on a temporal logic; and a time step logical formula generation means configured to generate, from the logical formula, a time step logical formula that is a logical formula representing a state at each time step to complete the multiple tasks, and wherein the operation sequence generation means is configured to generate the operation sequences based on the time step logical formula.

Supplementary Note 12

The control device according to Supplementary Note 11, wherein the operation sequence generation means further comprises an abstract model generation means configured to generate an abstract model in which dynamics in a workspace of the one or more robots is abstracted, and wherein the operation sequence generation means is configured to generate the operation sequences by determining a control input for each time step for controlling the one or more robots through an optimization at least using the abstract model and the time step logical formula as constraint conditions.

Supplementary Note 13

A control method executed by a computer, the control method comprising:

generating, in a case where multiple tasks to be executed by one or more robots are designated, one or more task groups obtained by classifying the multiple tasks; and generating one or more operation sequences of the one or more robots for completing the multiple tasks so as to put completion time of tasks included in the task group close to one another.

Supplementary Note 14

A storage medium storing a program executed by a computer, the program causing the computer to function as:

a task group generation means configured to generate, in a case where multiple tasks to be executed by one or more robots are designated, one or more task groups obtained by classifying the multiple tasks; and an operation sequence generation means configured to generate one or more operation sequences of the one or more robots for completing the multiple tasks so as to put completion time of tasks included in the task group close to one another.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A Control device
2, 2A, 2B Task instruction device
4 Storage device
5, 5A, 5B Robot
7 Measurement device
41 Application information storage unit
100 Control system

What is claimed is:

1. A control device comprising:

at least one memory configured to store instructions; and at least one processor configured to execute the instructions to generate, in a case where multiple tasks to be executed by one or more robots are designated, one or more task groups obtained by classifying the multiple tasks, by input information that designates, from the multiple tasks, tasks whose completion time is to be synchronized;

convert the multiple tasks to a logical formula based on a temporal logic;

generate, from the logical formula, a time step logical formula that is a logical formula representing a state at each time step to complete the multiple tasks; and generate one or more operation sequences of the one or more robots for completing the multiple tasks to synchronize completion times of tasks included in each task group of the one or more task groups by performing an optimization based on an objective function including at least a term relating to a variation in the completion times of the tasks included in the each task group based on the time step logical formula, and control the one or more robots to execute the one or more operation sequences, wherein each of the multiple tasks comprises one or more subtasks which is a unit that can be accepted by each of the one or more robots.

2. The control device according to claim 1, wherein the at least one processor is configured to execute the instructions to generate the one or more operation sequences by performing the optimization further based on a constraint condition that a completion time of each of the tasks included in the task group coincides with one another or is within a predetermined time difference.

3. The control device according to claim 1, wherein the at least one processor is configured to execute the instructions to generate the one or more task groups based on a timing at which each of the multiple tasks is designated.

4. The control device according to claim 1, wherein the at least one processor is configured to execute the instructions to generate the one or more task groups based on a category of each of the multiple tasks.

5. The control device according to claim 1, wherein the at least one processor is configured to execute the instructions to generate the one or more operation sequences to synchronize the completion time of the tasks included in the task group corresponding to a designated expected time of work completion.

6. The control device according to claim 1, wherein, in a case of accepting a designation of the multiple tasks from a task instruction device, the at least one processor is configured to execute the instructions to generate the one or more task groups by receiving, from the task instruction device, the input information.

7. The control device according to claim 1, wherein the at least one processor is configured to execute the instructions to regenerate the one or more operation sequences when there are instructions to add or delete a task included in the task group.

8. The control device according to claim 1, wherein, when an additional task group was generated after generation of the one or more operation sequences, the at least one processor is configured to execute the instructions to regenerate the one or more operation sequences.

9. The control device according to claim 1, wherein the at least one processor is configured to execute the instructions to generate the one or more operation sequences based on at least one of:

information relating to a configuration of the one or more robots, information relating to a motion characteristic of the one or more robots, or state information indicating a state of a workspace in which the one or more robots operate.

10. The control device according to claim 1, wherein the at least one processor is configured to execute the instructions to generate an abstract model in which dynamics in a workspace of the one or more robots is abstracted, and wherein the at least one processor is configured to execute the instructions to generate the one or more operation sequences by determining a control input for each time step for controlling the one or more robots through an optimization at least using the abstract model and the time step logical formula as constraint conditions.

11. The control device according to claim 1, wherein the at least one processor is configured to execute the instructions to classify the multiple tasks into the one or more task groups according to completion timings of the multiple tasks indicated by task classification information.

12. The control device according to claim 1, wherein each of the multiple tasks corresponds to an individual order item included in an order placed by a user, and wherein the one or more robots execute the tasks corresponding to the individual order items.

13. The control device according to claim 1, wherein the at least one processor is configured to classify the multiple tasks into the one or more task groups on a per-table basis, such that tasks corresponding to order items for the same table are classified into the same task group.

14. The control device according to claim 1, wherein the at least one processor is configured to classify the multiple tasks into the one or more task groups on a per-category basis, the category indicating a type of an order item, such that tasks corresponding to order items belonging to the same category are classified into the same task group.

15. The control device according to claim 1, wherein the at least one processor is configured to classify the multiple tasks into the one or more task groups based on designation by a user, such that tasks corresponding to order items designated by the user are classified into the same task group.

16. A control method executed by a computer, the control method comprising:

generating, in a case where multiple tasks to be executed by one or more robots are designated, one or more task groups obtained by classifying the multiple tasks, by input information that designates, from the multiple tasks, tasks whose completion time is to be synchronized;

converting the multiple tasks to a logical formula based on a temporal logic;

generating, from the logical formula, a time step logical formula that is a logical formula representing a state at each time step to complete the multiple tasks; and generating one or more operation sequences of the one or more robots for completing the multiple tasks to synchronize completion times of tasks included in each task group of the one or more task groups by performing an optimization based on an objective function including at least a term relating to a variation in the completion times of the tasks included in the each task group based on the time step logical formula, and controlling the one or more robots to execute the one or more operation sequences, wherein each of the multiple tasks comprises one or more subtasks which is a unit that can be accepted by each of the one or more robots.

17. A non-transitory computer readable storage medium storing a program executed by a computer, the program causing the computer to:

generate, in a case where multiple tasks to be executed by one or more robots are designated, one or more task groups obtained by classifying the multiple tasks, by input information that designates, from the multiple tasks, tasks whose completion time is to be synchronized;

convert the multiple tasks to a logical formula based on a temporal logic;

generate, from the logical formula, a time step logical formula that is a logical formula representing a state at each time step to complete the multiple tasks; and generate one or more operation sequences of the one or more robots for completing the multiple tasks to synchronize completion times of tasks included in each task group of the one or more task groups by performing an optimization based on an objective function including at least a term relating to a variation in the completion times of the tasks included in the each task group based on the time step logical formula, and control the one or more robots to execute the one or more operation sequences, wherein each of the multiple tasks comprises one or more subtasks which is a unit that can be accepted by each of the one or more robots.

* * * * *